(12) United States Patent
Adam et al.

(10) Patent No.: US 11,368,489 B2
(45) Date of Patent: Jun. 21, 2022

(54) APPARATUS, SYSTEM AND METHOD FOR SECURITY MANAGEMENT BASED ON EVENT CORRELATION IN A DISTRIBUTED MULTI-LAYERED CLOUD ENVIRONMENT

(71) Applicant: Nokia Technologies Oy, Espoo (FI)

(72) Inventors: Iris Adam, Munich (DE); Jing Ping, Chengdu (CN); Stephane Mahieu, Munich (DE)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 16/764,871

(22) PCT Filed: Nov. 20, 2017

(86) PCT No.: PCT/CN2017/111883
§ 371 (c)(1),
(2) Date: May 17, 2020

(87) PCT Pub. No.: WO2019/095374
PCT Pub. Date: May 23, 2019

(65) Prior Publication Data
US 2020/0344267 A1    Oct. 29, 2020

(51) Int. Cl.
*G06F 21/57*    (2013.01)
*H04L 9/40*    (2022.01)
(Continued)

(52) U.S. Cl.
CPC .............. *H04L 63/20* (2013.01); *G06F 21/57* (2013.01); *G06F 21/6218* (2013.01);
(Continued)

(58) Field of Classification Search
CPC . H04L 63/20; H04L 63/1416; H04L 63/1425; G06F 21/57
(Continued)

(56) References Cited

U.S. PATENT DOCUMENTS 7,278,156 B2    10/2007  Mei et al.
8,689,282 B1    4/2014   Oprea et al.
(Continued)

FOREIGN PATENT DOCUMENTS

CN    103118053 A    5/2013
CN    103428177 A    12/2013
(Continued)

OTHER PUBLICATIONS

Bernstein et al., "Intercloud Security Considerations", IEEE Second International Conference on Cloud Computing Technology and Science, Nov. 30-Dec. 30, 2010, 537-544.
(Continued)

*Primary Examiner* — Teshome Hailu
(74) *Attorney, Agent, or Firm* — Nokia Technologies Oy

(57) ABSTRACT

An apparatus for security management based on event correlation in a distributed multi-layered cloud environment is disclosed, wherein the distributed multi-layered cloud environment comprises at least one first layer cloud service provider, and at least one second layer cloud service provider as a tenant of the first layer cloud service provider, and the apparatus is installed at least on one cloud service provider of the first layer cloud service provider and the second layer cloud service provider, the apparatus comprising: a central processing module configured to: provide correlation as a Service (CORRaaS) to a plurality of tenants as virtualized security appliances or virtualized security functions for the plurality of tenants's lices, generate a second interface for allowing the plurality of tenants to configure the correlation as a Service (CORRaaS), and correlate and process security events from security functions in the plurality of tenants' slices to form processed security event data, and to detect or predict attacks or anomalies or incompliance with security requirements; and a third inter-
(Continued)

face for transferring the processed security event data and/or log data and/or raw data to the plurality of tenants' security management systems and/or to a plurality of cloud service providers' security management systems; and a fourth interface towards a cloud manager of the cloud service provider for causing the cloud manager to mitigate the detected or predicted attacks or anomalies or incompliance with security requirements. A corresponding system and method for security management based on event correlation in a distributed multi-layered cloud environment, as well as a computer readable medium, are also provided.

18 Claims, 4 Drawing Sheets

(51) Int. Cl.
  *G06F 21/62* (2013.01)
  *H04L 67/10* (2022.01)
(52) U.S. Cl.
  CPC ...... *H04L 63/1416* (2013.01); *H04L 63/1425* (2013.01); *H04L 63/1441* (2013.01); *H04L 67/10* (2013.01)
(58) Field of Classification Search
  USPC .......................................................... 726/1
  See application file for complete search history.

(56) References Cited

U.S. PATENT DOCUMENTS

| | | | |
|---|---|---|---|
| 9,128,773 B2 | 9/2015 | Beaty et al. | |
| 9,419,857 B1 | 8/2016 | Ryan et al. | |
| 10,411,996 B2* | 9/2019 | Pani | H04L 41/0873 |
| 10,594,034 B1* | 3/2020 | Tran | G06N 3/088 |
| 10,826,877 B2* | 11/2020 | Nayshtut | H04L 63/062 |
| 2011/0145593 A1* | 6/2011 | Auradkar | H04L 67/1097 713/189 |
| 2014/0019335 A1 | 1/2014 | MacDonald et al. | |
| 2015/0067171 A1 | 3/2015 | Yum et al. | |
| 2015/0139238 A1 | 5/2015 | Pourzandi et al. | |
| 2016/0014159 A1 | 1/2016 | Schrecker et al. | |
| 2016/0020959 A1 | 1/2016 | Rahaman | |
| 2017/0046230 A1 | 2/2017 | Guzik | |
| 2017/0111331 A1* | 4/2017 | Auradkar | H04L 63/0428 |
| 2017/0132306 A1 | 5/2017 | Brew et al. | |
| 2017/0257432 A1 | 9/2017 | Fu et al. | |
| 2018/0367388 A1* | 12/2018 | Pani | H04L 41/0873 |
| 2018/0367449 A1* | 12/2018 | Pani | H04L 41/0873 |
| 2019/0052549 A1* | 2/2019 | Duggal | H04L 41/5019 |

FOREIGN PATENT DOCUMENTS

| | | |
|---|---|---|
| CN | 105282178 A | 1/2016 |
| CN | 106341386 A | 1/2017 |
| CN | 107004095 A | 8/2017 |

OTHER PUBLICATIONS

Hamad et al., "Managing Intrusion Detection as a Service in Cloud Networks", International Journal of Computer Applications, vol. 41, No. 1, Mar. 2012, pp. 35-40.

Alharkan et al., "IDSaaS: Intrusion Detection Systems as a Service in Public Clouds", Proceedings of the 2012 12th IEEE/ACM International Symposium on Cluster, Cloud and Grid Computing, May 2012, pp. 686-687.

Wenge et al., "Security Information and Event Monitoring as a Service: A Survey on Current Concerns and Solutions", PIK—Praxis der Informationsverarbeitung und Kommunikation, vol. 37, No. 2, Jun. 2014, pp. 163-170.

"Network Functions Virtualisation (NFV) Release 3; Security; Security Management and Monitoring specification", ETSI GS NFV-SEC 013 V3.1.1, Feb. 2017, pp. 1-54.

Raju et al., "Event Correlation in Cloud: A Forensic Perspective", Computing, vol. 98, 2016, 22 pages.

International Search Report and Written Opinion received for corresponding Patent Cooperation Treaty Application No. PCT/CN2017/111883, dated Aug. 23, 2018, 9 pages.

Extended European Search Report received for corresponding European Patent Application No. 17932307.6, dated May 3, 2021, 7 pages.

Office action received for corresponding Chinese Patent Application No. 201780097010.3, dated Nov. 24, 2021, 7 pages of office action and no page of translation available.

\* cited by examiner

APPARATUS, SYSTEM AND METHOD FOR SECURITY MANAGEMENT BASED ON EVENT CORRELATION IN A DISTRIBUTED MULTI-LAYERED CLOUD ENVIRONMENT

RELATED APPLICATION

This application claims priority to PCT Application No. PCT/CN2017/111883, filed on Nov. 20, 2017, of which is incorporated herein by reference in its entirety.

TECHNICAL FIELD

Embodiments of the present disclosure relate generally to security management in cloud environments, more particularly, to an apparatus, system and method for security management based on event correlation in a distributed multi-layered cloud environment.

BACKGROUND

Software as a Service (SaaS) providers utilize cloud and networking resources from other Infrastructure as a Service (IaaS) and Platform as a Service (PaaS) providers based on negotiated Service Level Agreement (SLA) contracts. Even, for Telco service providers (as in 4G and 5G), there may be single infrastructure providers, that hosts several Telco SaaS as tenants on a shared infrastructure partitioned for isolation of tenants, called "cloud slices". Further, 5G Telco service providers may offer complete virtual networks ("network slices"), which may be operated by tenants like Verticals. It is assumed that in most cases the Telco service providers will manage the network slices.

Exclusively owned virtual machines (VMs) on a shared infrastructure are a challenge for security management. Cloud service providers (like IaaS/PaaS) both manage the resources from the shared infrastructure as well as need to adapt to changing security demands from tenants and to support the pay-by-use business model of cloud computing. Further, the cloud service providers must ensure the compliance with SLA requirements, e.g. IaaS providers must guarantee the latency related SLAs from each tenant. Security functions like intrusion detection/prevention may lower the end-to-end performance of enterprise applications and the prevention of SLA violations must consider the impact from provisioning and configuration of security functions.

Tenants need to be compliant with the security requirements from their applications, and they are dependent on the security mechanisms that the service providers have in place, e.g. they must trust the cloud service providers to protect against attacks from outsiders and insiders (other tenants). Tenants wish to understand how security works, and their concerns are related to incompliance with regulatory and industrial requirements, latency in incident response, and so on. Thus, visibility and transparency related to security will become very important feature of cloud services, and tenants need to purchase additional services from the cloud providers to deploy their own cybersecurity defense mechanisms Future business applications need high performing and secure networks and are deployed on 4G and 5G architecture models consisting of IaaS, PaaS and SaaS providers. Today, the offered security solutions are far from the integration in a distributed cloud environment where multiple VMs reside in tenants' Network Slices deployed on a shared infrastructure. In addition, no correlation between events from tenants' slices and providers' clouds is built and enforced by SLAs, also sensitivity and privacy of the telemetry data is not defined in SLAs. Further, today's security management does not consider that provision and configuration of physical and virtualized security functions may lower the performance of business applications.

Although there is a lot of research on security and security management in cloud environments, an automated security management used by cloud service providers and tenants, considering Multi-Tenancy and service distribution, addressing the compliance with SLAs and the support of resilience against cyberattacks without performance downgrade is missing up to now.

BRIEF SUMMARY

An apparatus, system, and method for security management based on event correlation in a distributed multi-layered cloud environment, as well as a computer readable medium are therefore provided.

In one example embodiment, an apparatus for security management based on event correlation in a distributed multi-layered cloud environment is provided, wherein the distributed multi-layered cloud environment comprises at least one first layer cloud service provider, and at least one second layer cloud service provider as a tenant of the first layer cloud service provider, and the apparatus is installed at least on one cloud service provider of the at least one first layer cloud service provider and the at least one second layer cloud service provider, the apparatus comprising:

a central processing module configured to: provide correlation as a Service (CORRaaS) to a plurality of tenants as virtualized security appliances or virtualized security functions for the plurality of tenants' slices, generate a second interface for allowing the plurality of tenants to configure the correlation as a Service (CORRaaS), and correlate and process security events from security functions in the plurality of tenants' slices to form processed security event data, and to detect or predict attacks or anomalies or incompliance with security requirements;

a third interface for transferring the processed security event data and/or log data and/or raw data to the plurality of tenants' security management systems and/or to a plurality of cloud service providers' security management systems; and a fourth interface towards a cloud manager of the cloud service provider for causing the cloud manager to mitigate the detected or predicted attacks or anomalies or incompliance with security requirements.

In another example embodiment, a system for security management based on event correlation in a distributed multi-layered cloud environment is provided, wherein the distributed multi-layered cloud environment comprises at least one first layer cloud service provider, and at least one second layer cloud service provider as a tenant of the first layer cloud service provider, the system comprising: at least one apparatus according to any embodiment of the present disclosure.

In another example embodiment, a method for security management based on event correlation in a distributed multi-layered cloud environment is provided, wherein the distributed multi-layered cloud environment comprises at least one first layer cloud service provider, and at least one second layer cloud service provider as a tenant of the first layer cloud service provider, and method is executed at least on one cloud service provider of the first layer cloud service provider and the second layer cloud service provider, the method comprising:

providing correlation as a Service (CORRaaS) to a plurality of tenants as virtualized security appliances or virtualized security functions for the plurality of tenants' slices, and allowing the plurality of tenants to configure the correlation as a Service (CORRaaS);

correlating and processing security events from security functions in the plurality of tenants' slices to form processed security event data, and to detect or predict attacks or anomalies or incompliance with security requirements;

transferring the processed security event data and/or log data and/or raw data to the tenants' security management systems and/or to cloud service providers' security management systems respectively; and causing a cloud manager of the cloud service provider to mitigate the detected or predicted attacks or anomalies or incompliance with security requirements.

In another example embodiment, there is provided a computer readable medium encoded with instructions that, when executed by one or more processors, cause an apparatus to perform the steps of the method for security management based on event correlation in a distributed multi-layered cloud environment according to any embodiment of the present disclosure.

BRIEF DESCRIPTION OF THE DRAWING(S)

Having thus described the disclosure in general terms, reference will now be made to the accompanying drawings, which are not necessarily drawn to scale, and wherein:

DETAILED DESCRIPTION OF SPECIFIC EMBODIMENTS

Figure 1:
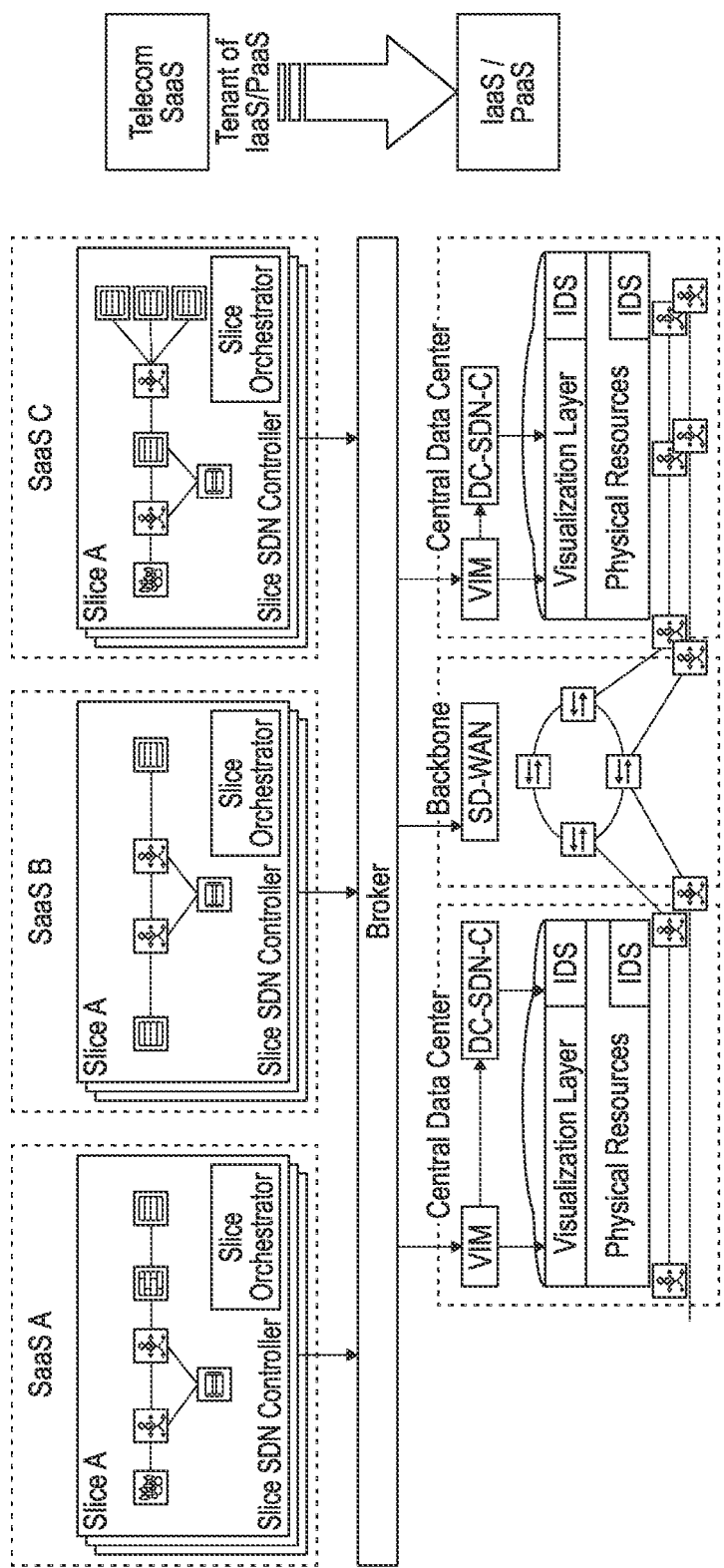
FIG. 1 shows a schematic diagram of a distributed multi-layered cloud environment in which the present disclosure may be implemented.

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. It is apparent to one skilled in the art that the embodiments of the present disclosure may be practiced without these specific details or with an equivalent arrangement. In other instances, well-known structures and devices are shown in block diagram form in order to avoid unnecessarily obscuring the embodiments of the present disclosure. Like reference numerals refer to like elements throughout.

Referring to FIG. 1, there is shown a schematic diagram of a distributed multi-layered cloud environment in which the present disclosure may be implemented.

As shown in FIG. 1, at least one central data center hosting a central cloud and at least one edge data center hosting an edge cloud are connected through a backbone, which may be a software-defined wide area network (SD-WAN). The edge data center and the central data center may each comprise a layer of physical resources (e.g., compute and storage resources), a virtualization layer, a virtual infrastructure manager (VIM), a data center software-defined network controller (DC SDN-C), etc. Each of the physical resource layer and the virtualization layer may comprise an intrusion detection system (IDS). The backbone may comprise various networking devices, such as gateways, routers, switches, etc. The resources of the clouds and the backbone are partitioned for the benefit of cloud tenants, e.g., in the form of Infrastructure as a Service (IaaS), or Platform as a Service (PaaS).

The tenants of the IaaS or PaaS clouds may be Telecom service providers, which may be SaaS (Software as a Service) cloud service providers providing SaaS cloud services to their own tenants. In FIG. 1, for example, three Telecom SaaS cloud service providers, SaaS A, SaaS B and SaaS C, are shown.

The tenants of the Telecom SaaS cloud service providers may be, e.g., vertical business providers, which may offer services to end-consumers, e.g. a car maker offers "Jam Warning Backend" service, "Map" service, etc. The Telecom SaaS cloud service providers may provide complete virtual networks (called network slices) to be operated by their tenants, e.g. vertical business providers. In FIG. 1, for example, each Telecom SaaS is shown to provide a number of virtual networks, Slice A, etc., for its tenants; and each network slice may comprise a slice SDN controller, a slice orchestrator and other networking devices.

As shown in FIG. 1, a "Broker" may be located between the IaaS/PaaS clouds and the Telecom SaaS clouds, for orchestrating resources including Service Level Agreement (SLA) negotiation to enable the collaboration between the heterogeneous and multi-layered clouds.

As may be appreciated by one skilled in the art, parts of the distributed multi-layered cloud environment as shown in FIG. 1 may be used in a 4G or 5G telecommunication architecture, and may also be used in other telecommunication or computer networks. It is also to be noted that the distributed multi-layered cloud environment as shown in FIG. 1 is only exemplary, instead of limitation to the environment in which the present disclosure may be implemented, which environment may comprise more, less or different components and/or arrangement thereof than those shown.

The present disclosure introduces a new logical management entity, which may be called "Security Management for Event Correlation in Multi-Tenancy Environments (SMEC)", that performs automated security management tasks in distributed multi-tenant (Telco and IT) cloud environments (IaaS, PaaS, SaaS as well as 5G clouds).

Instances of the SMEC may be installed on various cloud service providers, and may be used by cloud service providers and tenants to implement a complex correlation process for detection of cyberattacks. During the whole process for management of security events (from deployment and configuration of Security Functions (SFs) to incident response handling), the compliance with tenants' SLAs may be ensured.

Figure 2:
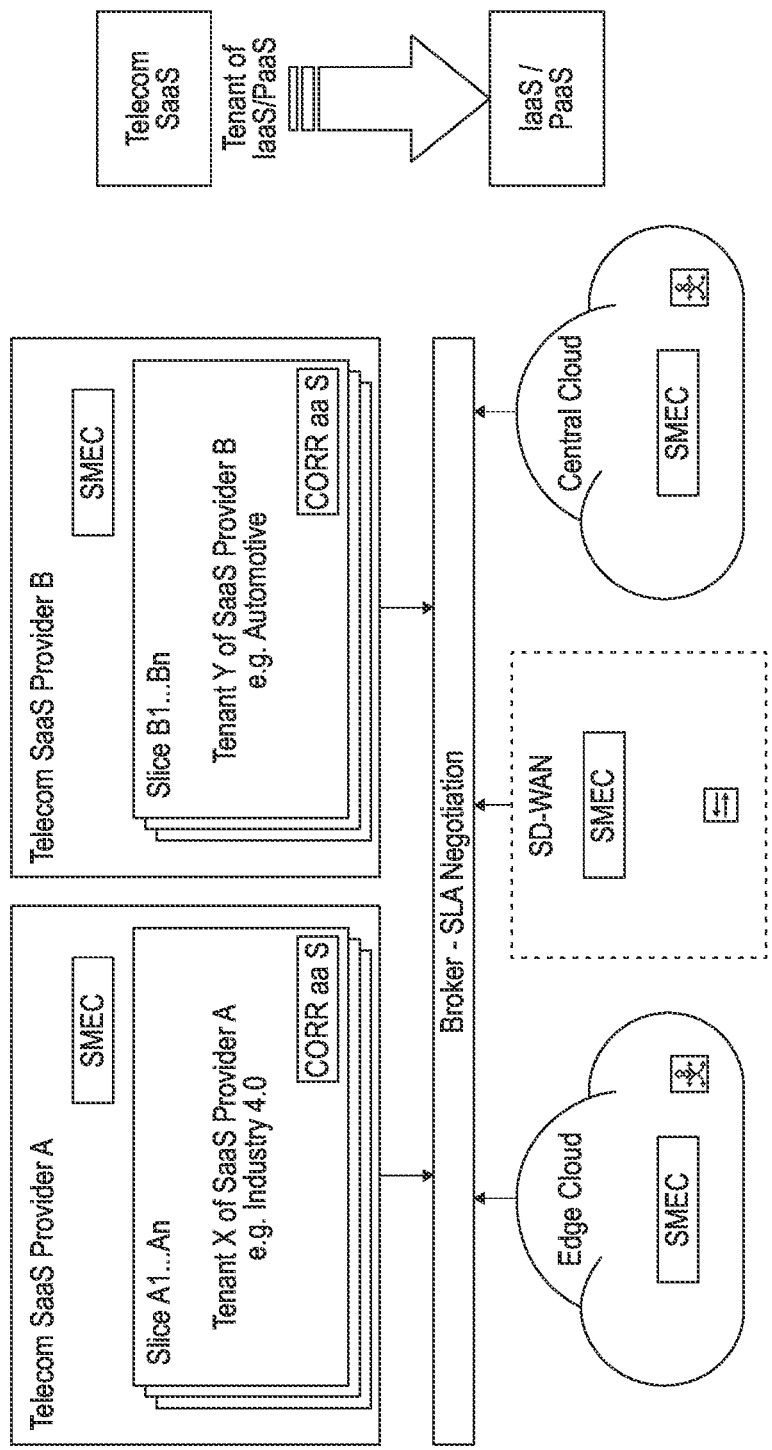
FIG. 2 shows a schematic diagram of a distributed multi-layered cloud environment with instances of the Security Management for Event Correlation in Multi-Tenancy Environments (SMEC) according to embodiments of the present disclosure installed on the various cloud service providers.

Referring to FIG. 2, there is shown a schematic diagram of a distributed multi-layered cloud environment with instances of the SMEC installed on the various cloud service providers.

As shown in FIG. 2, IaaS/PaaS clouds provide resources of an edge cloud, a software-defined wide area network (SD-WAN) and a central Cloud, respectively, and the tenants are Telecom SaaS providers. In some cases, there may be an upper layer above the SaaS layer, which may utilize predefined applications or virtual networks (slices) to offer services to end-consumers. In FIG. 2, two Telecom SaaS providers A and B are shown, with Telecom SaaS provider A providing Slice A1-An for its tenants such as Tenant X (e.g., Industry 4.0, a vertical business provider), and Telecom SaaS provider B providing Slice B1-Bn for its tenants such as Tenant Y (e.g., Automotive, another vertical business provider).

As shown in FIG. 2, in embodiments of the present disclosures, automated SLA-driven security management is provided in multiple layers of the distributed multi-layered cloud environment. Specifically, instances of the SMEC are installed on the IaaS/PaaS cloud service providers, the SD-WAN, and the Telecom SaaS providers, respectively. Further, the SMEC of a cloud service provider can interact with SMEC entities of all tenants. Similarly, the SMEC of a tenant can interact with SMEC entities of all its cloud providers. In embodiments of the present disclosure, correlated data is transferred between cloud service providers (IaaS/PaaS, SaaS) and Tenants (SaaS, Verticals) via the SMECs thereof to implement security mechanisms against cyberattacks considering private/sensitive information. The data is exchanged between SMECs in different layers in both directions based on SLAs.

Key features of embodiments of the present disclosure include any one or more of the following:

1. Automated event data transfer between heterogeneous cloud service providers based on SLAs, that is, transfer of alarm data from a SMEC to other correlation systems, such as tenants' SMECs.

In embodiments of present, a multi-layer approach is proposed to avoid the concerns of a centralized system like connectivity issues, single point of failure, delay in incident response and so on. Therefore, security management hierarchy is considered across multiple layers including vertical business providers, telecom service providers, and IaaS/PaaS cloud service providers.

Further, security functions like IDS, Anomaly Detection Systems and so on may suffer from false alarms and need further investigations in order to reduce false positives. In addition, false positives and duplicated alarms as well as the transport of raw data may lead to performance issues. As such, an SMEC with event correlation and notification capabilities in each layer of a distributed cloud environment is proposed. Each cloud service provider (XaaS) has its own SMEC entity. If a tenant (like a vertical business provider) is a XaaS provider, it may also have an own security management entity (like SMEC). Thus, (real-time) reporting functionality according to tenants' security SLAs, e.g. to enable notification of end device management system is realized.

2. Correlation of security events from heterogeneous monitoring components cross multi-tenancies, e.g. to correlate data from tenants' slices with event and log data from IaaS, in order to detect and respond to incidents and anomalies.

Correlation of security and network events of multiple tenants may be used to filter duplicated alarms, detect distributed attacks, or reduce false positive alarms (e.g. caused by anomaly detection). For example, the SMEC of the IaaS/SaaS provider may detect that virtual machines (VMs) of many tenants suffered a DDoS attack. Based on the events/logs collected from all compromised tenants, the SMEC may deduce that it is caused by the vulnerability of the cloud network configuration, and redress correspondingly.

In some embodiments, correlation of events may be performed based on correlation rules. The correlation rules may differ between signature-based, heuristic-based, anomaly-based and Bayesian inference-based rules to detect zero-day attacks. In some further embodiments, the correlation rules may be configured by the user in advance, and may further be reconfigured during runtime.

3. Collecting events from multiple cloud providers.

In some embodiments, in a tenant centric approach, the tenant can collect raw events or correlated events from multiple cloud providers, and infer an attack based on the data from multiple clouds in real-time. For example, one of the tenant's admin logins to an application deployed in cloud A from Beijing, while the cloud B reports an event to the tenant that the same admin just logins to another application of the tenant deployed in Cloud B from Munich. Based on the two events from both clouds A and B, the tenant's SMEC can suppose this admin account is suspicious.

4. Cloud service providers are enabled to offer security functions as a service, possibly offering as managed services or separate virtualized monitoring and correlation components.

For example, in a 5G telecommunication network, the cloud service providers will be responsible to ensure the compliance with SLA requirements. In this regard, any one of the IaaS/PaaS service providers is responsible to guarantee SLAs for all tenants' SaaS, as well as the SaaS provider is responsible to guarantee SLAs for all network slices for tenants. Further, cloud consumers do not manage or control the underlying cloud infrastructure including networking, servers, compute, storage resources and so on. In addition, in most cases the Telecom SaaS provider will manage the network slices.

Thus, in embodiments of the present disclosure, cloud service providers may offer security functions as a Service to provide/configure security functions in slices. (CORR-as-a Service, FW-as-a-Service, IDS-as-a-Service and the like).

This service enables to monitor virtual machines (e.g. resource changes of VMs) within a pre-defined virtual network in private and public clouds as well as to correlate all relevant (event and log) data for detecting of attacks and anomalies. The virtualized security appliances or the virtual security functions can be fully managed by the cloud service provider offered as 'managed service' or as separate FWaaS, IDSaaS and CORRaaS. The cloud service provider can enable a self-service interface to allocate and configure the virtualized security appliances and functions enhanced with a usage-based billing model.

5. Mitigation strategies to guarantee business continuity in case of security incidents. Monitoring and incident response handling to mitigate attacks (e.g. Dos/DDoS and targeted attacks) based on SLAs.

In some embodiments, after the SMEC detects attacks and anomalies by correlating security events and log data, it may automatically initiate the process to mitigate the attacks or anomalies, e.g., triggering the cloud manager or the SLA manager, respectively, to take appropriate actions, like scaling virtual security functions.

6. Performance prediction and guarantee based on SLA requirements: management and configuration of physical security functions as well as virtual security appliances and functions under SLA constraints 5G communication technology will bring applications with very high bandwidth and very low latency requirements (e.g., telerobotics, connected cars) and Service Level Agreement (SLA) violation may lead to legal and financial issues. On the other hand, security is a big concern and additional resources are needed to fulfill the strict security requirements from tenants. Thus, cloud service providers need mechanisms for deployment and configuration of security functions (Firewalls, Intrusion Detection Systems, Intrusion Prevention Systems and the like) under strong performance (e.g. latency) requirements during set-up of a service. Further, cloud service providers need to dynamically add/provide cyber security capabilities and as such to automatically adjust the security controls of the service during run-time without violating the performance requirements from IoT applications in the 5G ecosystem.

In some embodiments, the SMEC allows cloud service providers to predict the performance (e.g. latency) required from deployment and configuration of security functions (e.g. IPS, CORRaaS) to secure virtualized resources for tenants of slices (e.g. Verticals as tenants of network slices), and to perform resource optimization to guarantee SLA requirements (both in deployment and run-time of security functions for resources used by the cloud service provider as well as resources of slices), e.g. not allowing lowered performance and increase of response time for business applications after adding and configuring security components. It is in contrast to the conventional approach where security functions are separately managed without interference with performance management and the fact that security functions may decrease the performance of applications is not considered.

7. Automated mitigation of security SLA violations during run-time of a service.

The on-demand deployment of cloud services will certainly apply to security and require SLA definition for security-relevant functions. The tenants are dependent on the security mechanisms that the service providers have in place, e.g. they must trust the cloud service providers to protect against attacks from outsiders and insiders (other tenants). Thus, 'Security SLAs' are needed to address tenants' concerns regarding security of their services and data, e.g. incompliance to industrial and regulatory requirements, latency in response time to security incidents.

Further, self-healing of the cloud service providers is critical to support various devices and applications in 5G. Self-healing means that security SLA violations are mitigated before tenants are affected. Thus, cloud service providers need automatic enforcement mechanisms for security SLAs and strategies to automatically mitigate SLA violations.

In some embodiments, the SMEC monitors all tenants' security related SLAs, which means that the SMEC monitors security SLA related key performance indicators (KPIs).

For example, the SMEC predicts that incident response time could be delayed. To resolve the possible violation of the security SLA, more security functions (like correlation SFs) need to be deployed and configured. In the meantime, the SMEC needs to interact with the cloud manager and possibly the SLA manager to get more resources or even reflect the security SLA update.

For another example, incident response handling functionality is provided to guarantee compliance with regulations like EU's General Data Protection Regulation (GDPR) based on SLAs regarding security.

It is to be noted that while some features of some embodiments of the present disclosure are described above, a particular embodiment of the present disclosure may not necessarily comprise all these features, rather it may only comprise one or several features described above.

Figure 3:
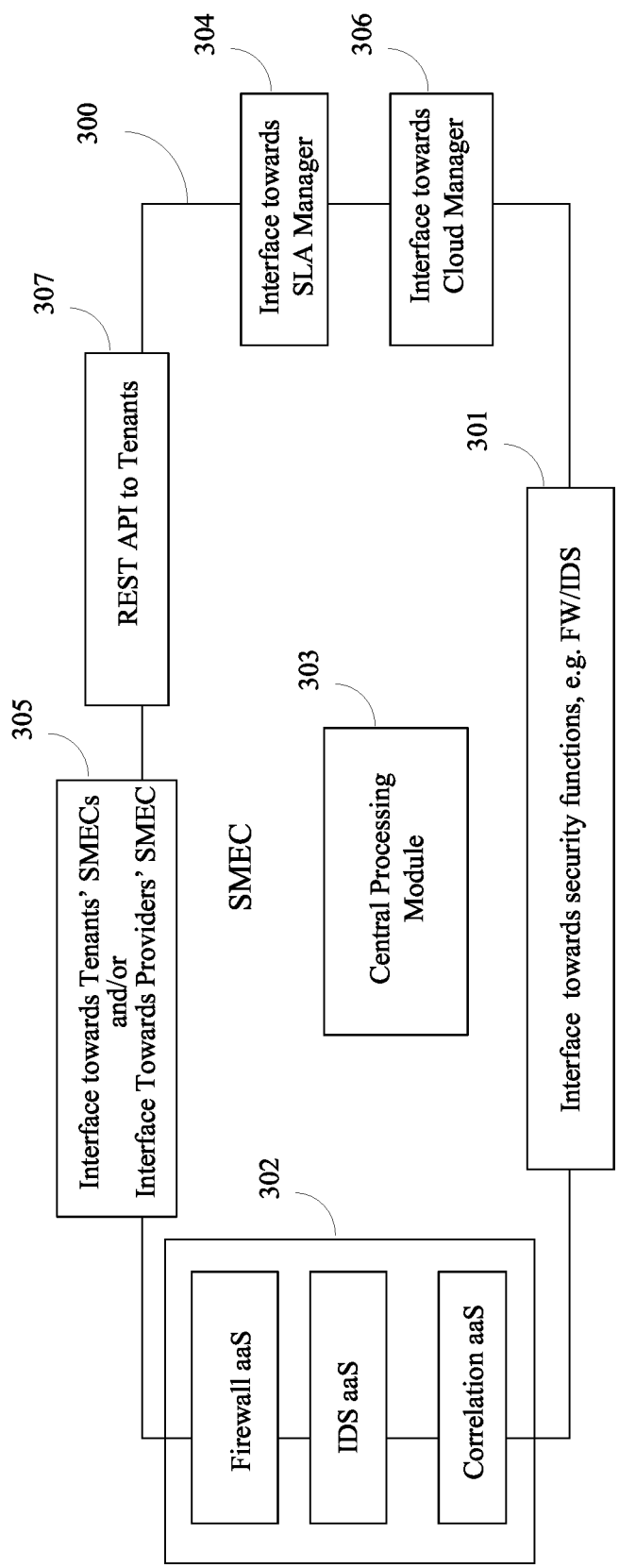
FIG. 3 shows a schematic diagram of a modular architecture of the Security Management for Event Correlation in Multi-Tenancy Environments (SMEC) according to embodiments of the present disclosure.

Referring to FIG. 3, there is shown a schematic diagram of a modular architecture of the Security Management for Event Correlation in Multi-Tenancy Environments (SMEC) 300 according to embodiments of the present disclosure.

As shown in FIG. 3, to perform its envisaged management tasks, the SMEC 300 provides the following interfaces and module:

1. An interface 301 towards physical security functions (PSF), virtual security appliances and functions (ISFs and VSF), or towards a security element manager of PSFs/ISFs/VSFs is necessary as PSFs/ISFs/VSFs can be either managed by the SMEC itself or indirectly via a (potentially third-party) security element manager. It is possible for multiple security element managers of different security vendors to manage the PSFs/ISFs/VSFs. This interface serves for configuration and reconfiguration of PSFs, ISFs and VSFs. Further, this interface is needed for collection of events for correlation purposes.

2. An interface 302 to provide monitoring and correlation capabilities to tenants regardless of the cloud model (Firewall, Intrusion Detection and Correlation as a Service). This interface is used to monitor virtual machines (e.g. resource changes of VMs) within a pre-defined virtual network in private and public clouds as well as to correlate all relevant (event and log) data for detecting attacks, anomalies and incompliance with security requirements. The virtual security appliances and functions can be fully managed by the cloud service provider offered as 'managed service' or as separate virtualized based FWaaS, IDSaaS and CORRaaS, e.g. the provider can enable a self-service interface to allocate and configure resources enhanced with a usage-based billing model. Tenants may choose their own protection settings (configuration of rule sets and detection thresholds) and define their own mitigation strategies.

3. A central processing module 303 for performing the SMEC's main operations, such as receiving and transmitting relevant data via the various interfaces, controlling the operations of the interfaces, monitoring and correlating security events and log data, determining and mitigating attacks/anomalies, etc.

4. An interface 304 towards SLA Manager is used to get performance related SLAs both for the deployment of SFs as well as configuration of PSFs and VSFs. Further, the interface is also required during operation when SMEC is triggered by the SLA Manager to reconfigure PSFs/VSFS to avoid SLA violations. The performance prediction and guarantee may be based on simulation tools or algorithms to evaluate the impact from provisioning and configuration of security functions on SLAs. In addition, this interface is used to transfer all Security SLAs for deployment of a service and to transfer information about security related SLA violations to the SLA manager for mitigation of the security related SLA violations during run-time.

5. An interface 305 towards tenants' Security Management Systems enables sharing of information according to tenants' SLAs. E.g. (filtered) event and log data based on privacy/sensitivity processed by the cloud provider's SMEC is transferred to tenants' Security Management System like SMEC or ETSI NFV Security Orchestrator using IDMEF or another adequate format. Vice versa, the cloud service provider may get information about incidents in tenants' virtual networks, e.g. to prevent impact from malicious applications. In the case that the SMEC is within a cloud service provider which itself is a tenant of other cloud service providers, the interface 305 may also include an interface towards the other cloud service providers alternatively or additionally, for transferring to and/or receiving security-related from the other cloud service providers security-related data.

6. An interface 306 towards Cloud Manager (like ETSI NFV VIM or 5G Slice Orchestrator), especially to fault and performance management, serves to get relevant (event and log) data for correlation, e.g. to analyze performance degradation of business applications. This interface is also used to mitigate Security SLA violations, e.g. mitigation of insider and outsider attacks by triggering the cloud manager to e.g. increase the resources of security service/function or reroute the traffic.

7. An interface 307 for human intervention, e.g., REST API to Tenants. For example, this interface may be used by administrators to manually update the Security SLAs.

It is to be noted that while a modular architecture of the SMEC according to some embodiments of the present disclosure is illustrated and described above, such an architecture is only exemplary, instead of limitation to the present disclosure. In other embodiments, the SMEC may comprise more, less or different components than those illustrated and described, and the relationship of inclusion, connection and function among those component may be different from those illustrated and described.

The "Security Management for Event Correlation in Multi-Tenancy Environments" (SMEC) may be implemented as a software package structured according to the envisaged tasks and the defined interfaces. The SMEC can be easily integrated in different layers of the distributed cloud environment. The SMEC may be implemented both as a separate logical management entity as well as logical functions integrated in other security management systems.

Figure 4:
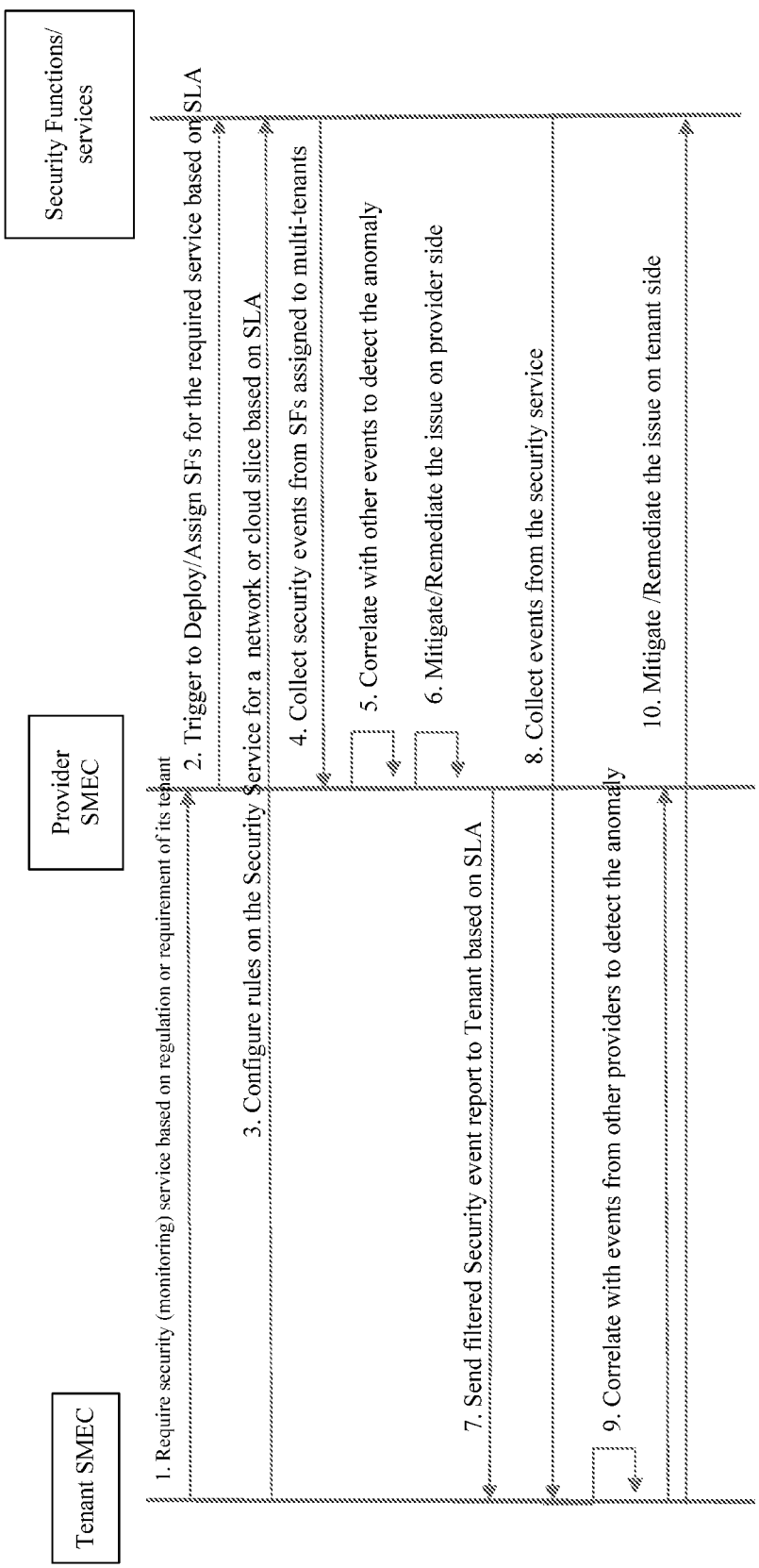
FIG. 4 a schematic time sequence diagram of deploying and configuring security functions and processing security events based on a SLA according to embodiments of the present disclosure.

Referring to FIG. 4, there is shown a schematic time sequence diagram of deploying and configuring security functions and processing security events based on a SLA according to embodiments of the present disclosure.

The precondition of the process is that the tenant and the provider have SLAs in place which covers both security and non-security (such as performance) related requirements.

As shown in FIG. 4, at step 1, the tenant SMEC requires security (monitoring) service based on regulation or requirement of its tenants from the provider SMEC. That is, according to regulations or the security requirements from its own customers, a tenant (e.g. a SaaS provider) ask a cloud provider (e.g. IaaS provider) to deploy a security service (e.g. a security monitoring service) to protect its applications/network functions in the provided cloud. The request is sent from the SMEC entity of the tenant to the SMEC of the provider.

At step 2, the provider SMEC triggers to deploy/assign security functions (SFs) for the required service based on SLAs. That is, based on service request and SLA of the tenant, the provider SMEC allocates existed or deploys new security functions which constitute the required service. The provider SMEC should confirm the assigned physical or virtualized functions to satisfy both the security functionality (e.g. IDS, Correlation, etc.) and performance capability requirements defined in the SLAs.

At step 3, the tenant SMEC configures rules on the security service for a network or cloud slice based on SLA. That is, the provider SMEC informs the tenant SMEC once the security service is created for the tenant. Then the tenant SMEC can configure the security rules (e.g. monitoring rules, correlation rules, etc.) on the service for a specific slice (e.g. a network slice/virtual network) based on the SLA requirement agreed with the slice user.

At step 4, the provider SMEC collects security events from SFs assigned to multiple tenants.

At step 5, the provider SMEC correlates the events and other events to detect the anomaly. That is, together with information collected from other resources, the provider SMEC correlates and analyzes the events to detect anomalies, potential attacks, vulnerabilities and/or incompliance with security requirements based on predefined rules.

At step 6, the provider SMEC mitigates/remediate the issue on the provider side. That is, the provider SMEC triggers (semi-)automatic procedures to mitigate/remediate the problem on the provider side, e.g. deploying and configuring DDoS protection appliance for all services in the cloud, updating security patch for the hypervisor, etc.

At step 7, the provider SMEC send filtered security event report to the tenant based on SLA. That is, in order to be visible and transparent to the tenant, the provider SMEC filters (remove irrelevant and sensitive information) and transfers raw/pre-processed/correlated events/alarms to the tenants based on SLAs.

At step 8, the tenant SMEC collects events from the security service. That is, the tenant SMEC collects events from the security services provided by multiple providers.

At step 9, the tenant SMEC correlates the received events with events from other providers to detect the anomaly. That is, the tenant SMEC correlates and analyzes the events from security services and SMECs of multiple providers to detect anomaly/potential attack/vulnerability on the tenant services/applications/cloud or network slices.

At step 10, the tenant SMEC mitigates/remediates the issue on the tenant side. That is, the tenant SMEC triggers (semi-)automatic procedures to mitigate/remediate the problem of the services/applications/network slices. e.g. reconfiguring the FW rules of the network slice.

Moreover, in some embodiments, the SMEC continuously maintains both security and non-security SLAs. That is, during run-time, the SMEC could predict the potential downgrade of both performance KPIs from re-configuration of security functions and security related KPIs and react autonomously in advance. For example, incident response time of the tenant could be impacted because of increasing traffic load in peak time. The SMEC should predict the impaction based on the load trend, threshold, and other correlated information learnt before, to trigger e.g. scaling of security services to mitigate the impact.

It is to be noted that while steps of some operations according to some embodiments of the present disclosure have been described above, the above description is only exemplary, instead of limitation to the present disclosure. In other embodiments of the present disclosure, these operations may have more, less or different steps than those illustrated and described, and the relationships of order, inclusion, function etc. among those steps may be different from those illustrated and described.

As may be appreciated by those skilled in the art in light of the above description, in one aspect of the present disclosure, there is provided an apparatus for security management based on event correlation in a distributed multi-layered cloud environment, wherein the distributed multi-layered cloud environment comprises at least one first layer cloud service provider, and at least one second layer cloud service provider as a tenant of the first layer cloud service provider, and the apparatus is installed at least on one cloud service provider of the first layer cloud service provider and the second layer cloud service provider, the apparatus comprising:

a central processing module configured to: provide correlation as a Service (CORRaaS) to a plurality of tenants as virtualized security appliances or virtualized security functions for the plurality of tenants' slices, generate a second interface for allowing the plurality of tenants to configure the correlation as a Service (CORRaaS), and correlate and process security events from security functions in the plurality of tenants' slices to form processed security event data, and to detect or predict attacks or anomalies or incompliance with security requirements;

a third interface for transferring the processed security event data and/or log data and/or raw data to the plurality of tenants' security management systems and/or to a plurality of cloud service providers' security management systems; and a fourth interface towards a cloud manager of the cloud service provider for causing the cloud manager to mitigate the detected or predicted attacks or anomalies or incompliance with security requirements.

In some embodiments, the central processing module is further configured to provide correlation as a Service (CORRaaS) to the plurality of tenants as a managed service.

In some embodiments, the cloud manager is a 5G cloud manager;

the fourth interface is further for receiving incident and log data in the plurality of tenant's slices and/or clouds, and/or in a plurality of providers' clouds from the 5G cloud managers; and the central processing module configured for the correlation and processing is further configured to correlate and process the security events from the security functions, and the incident and log data from the 5G cloud manager to form the processed security event data, and to detect or predict attacks or anomalies or incompliance with security requirements.

In some embodiments, the third interface is further for receiving processed or raw event data or log data from the plurality of tenants' security management systems and/or from the plurality of cloud service providers' security management systems; and the central processing module configured for the correlation and processing is further configured to correlate and process the security events from the security functions, and the processed or raw event data or log data from the tenants' security management systems and/or from the plurality of cloud service providers' security management systems to form the processed security event data, and to detect or predict attacks or anomalies or incompliance with security requirements.

In some embodiments, the second interface is further for allowing the plurality of tenants to configure the correlation as a service by defining correlation rules and mitigation strategies for the plurality of tenants' slices, and/or to re-configure the correlation as a service by updating correlation rules and mitigation strategies for the plurality of tenants' slices during run-time.

In some embodiments, the central processing module configured for the correlation and processing is further configured to, at least one of correlate and combine related security events, reduce false positives and duplicated security events, and filter out privacy or sensitive information of tenants and/or cloud service providers to form the processed security event data.

In some embodiments, the fourth interface is further for causing the cloud manager to adjust resources in the plurality of tenants' slices during run-time of a service in order to mitigate the detected attacks or anomalies or incompliance with security requirements.

In some embodiments, the apparatus further comprises: a first interface for configuring the security functions in the plurality of tenants' slices, and for reconfiguring the security functions in the plurality of tenants' slices during run-time of a service to mitigate the detected attacks or anomalies or incompliance with security requirements.

In some further embodiments, the configuring the security functions comprises configuring correlation rules and/or mitigation strategies, and the reconfiguring the security functions comprises reconfiguring correlation rules and/or mitigation strategies.

In some further embodiments, the central processing module is further configured to:

predict impact from deployment and/or configuration and/or reconfiguration of security functions on performance requirements from the plurality of tenants, and guarantee the performance requirements from the plurality of tenants by configuring or reconfiguring the security functions through the first interface and/or configuring or reconfiguring the correlation as a Service (CORRaaS) through the second interface to avoid incompliance with the performance requirements.

In some further embodiments, the apparatus further comprises a fifth interface towards a SLA manager for receiving security related Service Level Agreements (SLAs);

the central processing module is further configured to:

monitor enforcements of the security related Service Level Agreements for services provided to the plurality of tenants, detect or predict a possible security related Service Level Agreement violation for a service provided to a tenant of the plurality of tenants, and automatically mitigate the possible security related Service Level Agreement violation by initiating configuration or reconfiguration of the security functions through the first interface and/or configuration or reconfiguration of the correlation as a Service (CORRaaS) through the second interface, and/or by sending information about the possible security related Service Level Agreement violation to the SLA manager through the fifth interface.

In some further embodiments, the first interface is further for configuring or re-configuring the security functions based on the security related Service Level Agreements; and/or the central processing module is further configured to provide correlation as a Service (CORRaaS) to the plurality of tenants based on the security related Service Level Agreements; and/or the third interface is further for transferring the processed security event data and/or log data and/or raw data to the plurality of tenants' security management systems and/or to the plurality of cloud service providers' security management systems based on the security related Service Level Agreements.

In some further embodiments, the fifth interface is further for receiving performance related Service Level Agreements from the SLA manager, and the central processing module is further configured to:

predict impact from the deployment and/or re-deployment and/or configuration and/or reconfiguration of security functions on performance requirements from the plurality of tenants, and guarantee the performance requirements from the plurality of tenants based on the performance related Service Level Agreements by initiating configuration or reconfiguration of the security functions through the first interface and/or configuration or reconfiguration of the correlation as a Service (CORRaaS) through the second interface to avoid possible Service Level Agreement violations, and/or by sending information about possible Service Level Agreement violations to the SLA manager through the fifth interface.

In some further embodiments, the first interface is further for deploying and configuring the security functions based on the performance related Service Level Agreements; and/or the central processing module is further configured to provide correlation as a Service (CORRaaS) to the plurality of tenants based on the performance related Service Level Agreements.

In some embodiments, the apparatus further comprises a sixth interface allowing an administrator to deploy and configure the security functions, and/or to specify rules and settings for the collection, correlation, detection and/or mitigation, and/or security requirements.

In some embodiments, the tenants' security management systems are instances of the apparatus installed on the tenants as cloud service providers.

In some embodiments, the first layer cloud service provider is an IaaS/PaaS cloud service provider, and the second layer cloud service provider is an SaaS cloud service provider, or wherein the first layer cloud service provider is a SaaS cloud service provider as a tenant of an IaaS/PaaS cloud service provider and offering network slices, and the second layer cloud service provider is a vertical business provider operating a network slice.

It is to be noted that, while an apparatus for security management based on event correlation in a distributed multi-layered cloud environment according to some embodiments of the present disclosure has been described above, the above description is only exemplary, rather than limitation to the present disclosure. In other embodiments of the present disclosure, the apparatus may comprise more, less or different components than those described, and the relationships of connection, inclusion, function etc. among those components may be different from those described.

As may be appreciated by those skilled in the art, in another aspect of the present disclosure, there is provided a system for security management based on event correlation in a distributed multi-layered cloud environment, wherein the distributed multi-layered cloud environment comprises at least one first layer cloud service provider, and at least one second layer cloud service provider as a tenant of the first layer cloud service provider, the system comprising: at least one apparatus for security management based on event correlation in a distributed multi-layered cloud environment according to any embodiment of the present disclosure.

As may be further appreciated by those skilled in the art, in yet another aspect of the present disclosure, there is provided a method for security management based on event correlation in a distributed multi-layered cloud environment, wherein the distributed multi-layered cloud environment comprises at least one first layer cloud service provider, and at least one second layer cloud service provider as a tenant of the first layer cloud service provider, and method is executed at least on one cloud service provider of the first layer cloud service provider and the second layer cloud service provider, the method comprising the following steps:

providing correlation as a Service (CORRaaS) to a plurality of tenants as virtualized security appliances or virtualized security functions for the plurality of tenants' slices, and allowing the plurality of tenants to configure the correlation as a Service (CORRaaS);

correlating and processing security events from security functions in the plurality of tenants' slices to form processed security event data, and to detect or predict attacks or anomalies or incompliance with security requirements;

transferring the processed security event data and/or log data and/or raw data to the tenants' security management systems and/or to cloud service providers' security management systems respectively; and causing a cloud manager of the cloud service provider to mitigate the detected or predicted attacks or anomalies or incompliance with security requirements.

In some embodiments, the cloud manager is a 5G cloud manager, and the method further comprises the following step:

receiving incident and log data in the plurality of tenant's slices and/or clouds, and/or in a plurality of providers' clouds from the 5G cloud manager; and the correlating and processing comprises: correlating and processing the security events from the security functions, and the incident and log data from the 5G cloud manager to form the processed security event data, and to detect or predict attacks or anomalies or incompliance with security requirements.

In some embodiments, the method further comprises: receiving processed or raw event data or log data from the plurality of tenants' security management systems and/or from the plurality of cloud service providers' security management systems; and the correlating and processing comprises: correlating and processing the security events from the security functions, and the processed or raw event data or log data from the tenants' security management systems and/or from the plurality of cloud service providers' security management systems to form the processed security event data, and to detect or predict attacks or anomalies or incompliance with security requirements.

In some embodiments, allowing the plurality of tenants to configure the correlation as a Service (CORRaaS) comprises: allowing the plurality of tenants to configure the correlation as a service by defining correlation rules and mitigation strategies for the plurality of tenants' slices, and/or to re-configure the correlation as a service by updating correlation rules and mitigation strategies for the plurality of tenants' slices during run-time.

In some embodiments, the correlating and processing comprises: at least one of correlating and combining related security events, reducing false positives and duplicated security events, and filtering out privacy or sensitive information of tenants and/or cloud service providers to form the processed security event data.

In some embodiments, causing a cloud manager of the cloud service provider to mitigate the detected or predicted attacks or anomalies or incompliance with security requirements comprises: causing the cloud manager to adjust resources in the plurality of tenants' slices during run-time of a service in order to mitigate the detected attacks or anomalies or incompliance with security requirements.

In some embodiments, the method further comprises the following steps: deploying and configuring the security functions in the plurality of tenants' slices; and reconfiguring the security functions in the plurality of tenants' slices during run-time of a service to mitigate the detected attacks or anomalies or incompliance with security requirements.

In some embodiments, the configuring the security functions comprises configuring correlation rules and/or mitigation strategies, and the reconfiguring the security functions comprises reconfiguring correlation rules and/or mitigation strategies.

In some embodiments, the method further comprises the following steps:

predicting impact from deployment and/or configuration and/or reconfiguration of security functions on performance requirements from the plurality of tenants; and guaranteeing the performance requirements from the plurality of tenants by by configuring or reconfiguring the security functions and/or configuring or reconfiguring the correlation as a Service (CORRaaS) to avoid incompliance with the performance requirements.

In some embodiments, the method further comprises the following steps:

receiving security related Service Level Agreements from a SLA manager;

monitoring enforcements of the security related Service Level Agreements for services provided to the plurality of tenants, detecting or predicting a possible security related Service Level Agreement violation for a service provided to a tenant of the plurality of tenants, and automatically mitigating the possible security related Service Level Agreement violation by initiating configuration or reconfiguration of the security functions and/or configuration or reconfiguration of the correlation as a Service (CORRaaS), and/or by sending information about the possible security related Service Level Agreement violation to the SLA manager.

In some embodiments, deploying or re-deploying and configuring or re-configuring the security functions in the plurality of tenants' slices are performed based on the security related Service Level Agreements; and/or providing correlation as a Service (CORRaaS) to the plurality of tenants is performed based on the security related Service Level Agreements; and/or transferring the processed security event data and/or log data and/or the security events to the plurality of tenants' security management systems and/or to the plurality of cloud service providers' security management systems is performed based on the security related Service Level Agreements.

In some embodiments, the method further comprises the following steps:

receiving performance related Service Level Agreements from the SLA manager;

predicting impact from the deployment and/or re-deployment and/or configuration and/or reconfiguration of security functions on performance requirements from the plurality of tenants, and guaranteeing the performance requirements from the plurality of tenants based on the performance related Service Level Agreements by initiating configuration or reconfiguration of the security functions and/or configuration or reconfiguration of the correlation as a Service (CORRaaS) to avoid possible Service Level Agreement violations and/or by sending information about possible Service Level Agreement Violations to the SLA manager.

In some embodiments, the method further comprises the following step: allowing an administrator to deploy and configure the security functions, and/or to specify rules and settings for the collection, correlation, detection and/or mitigation, and/or security requirements.

In some embodiments, the method is further executed by the tenants' security management systems.

In some embodiments, the first layer cloud service provider is an IaaS/PaaS cloud service provider, and the second layer cloud service provider is an SaaS cloud service provider, or wherein the first layer cloud service provider is a SaaS cloud service provider as a tenant of an IaaS/PaaS cloud service provider and offering network slices, and the second layer cloud service provider is a vertical business provider operating a network slice.

It is to be noted that while the steps of the method for security management based on event correlation in a distributed multi-layered cloud environment according to some embodiments of the present disclosure have been described above, the above description is only exemplary, instead of limitation to the present disclosure. In other embodiments of the present disclosure, these operations may have more, less or different steps than those described, and the relationships of order, inclusion, function etc. among those steps may be different from those described.

As may be further appreciated by those skilled in the art, in a further aspect of the present disclosure, there is provided a computer readable medium encoded with instructions that, when executed by one or more processors, cause an apparatus to perform the steps of at least the method for security management based on event correlation in a distributed multi-layered cloud environment according to any embodiment of the present disclosure.

Embodiments of the present disclosure provide one or more of the following advantages:

A distributed architecture for provisioning cyber security in a distributed multi-layered cloud environment is provided;

By sharing security information between providers' and tenants' clouds, and correlating security events and log data, the detection of attacks and anomalies is improved, automatic mitigation is realized, and business continuity is ensured;

In sharing and correlating security information, redundant information and false alarms are reduced, privacy and sensitive information are filtered out;

Visibility and transparency related to security for tenants are improved;

Tenants are enabled to purchase security functions as services from the cloud service provider;

Impact of deployment and operation of security functions on the performance is considered and compliance with SLA requirements is guaranteed, and violation of SLA is automatically mitigated.

It is to be understood that the apparatus, system and method according to embodiments of the present disclosure may be implemented in a cloud computing environment. As known in the art, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In a cloud computing node there may be a computer system/server, which is operational with numerous other general purpose or special purpose computing system environments or configurations. Examples of well-known computing systems, environments, and/or configurations that may be suitable for use with the computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server may be described in the general context of computer system-executable instructions, such as program modules, being executed by a computer system. Generally, program modules may include routines, programs, objects, components, logic, data structures, and so on that perform particular tasks or implement particular abstract data types. The computer system/server may be practiced in distributed cloud computing environments where tasks are performed by remote processing devices that are linked through a communications network. In a distributed cloud computing environment, program modules may be located in both local and remote computer system storage media including memory storage devices.

The computer system/server in a cloud computing node may be in the form of a general-purpose computing device. The components of the computer system/server may include, but are not limited to, one or more processors or processing units, a system memory, and a bus that couples various system components including the system memory to the processors.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server typically includes a variety of computer system readable media. Such media may be any available media that is accessible by computer system/server, and it includes both volatile and non-volatile media, removable and non-removable media.

The system memory can include computer system readable media in the form of volatile memory, such as random access memory (RAM) and/or cache memory. The computer system/server may further include other removable/non-removable, volatile/non-volatile computer system storage media. By way of example only, the storage system can be provided for reading from and writing to a non-removable, non-volatile magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. The memory may include at least one program product having a set (e.g., at least one) of program modules that are configured to carry out the functions of embodiments of the present disclosure.

Program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the present disclosure as described herein.

The computer system/server may also communicate with one or more external devices such as a keyboard, a pointing device, a display, etc.; one or more devices that enable a user to interact with computer system/server; and/or any devices (e.g., network card, modem, etc.) that enable the computer system/server to communicate with one or more other computing devices. Such communication can occur via Input/Output (I/O) interfaces. Still yet, the computer system/server can communicate with one or more networks such as a local area network (LAN), a general wide area network (WAN), and/or a public network (e.g., the Internet) via network adapter. The network adapter may communicate with the other components of the computer system/server via the bus. It should be understood that other hardware and/or software components could be used in conjunction with the computer system/server. Examples, include, but are not limited to: microcode, device drivers, redundant processing units, external disk drive arrays, RAID systems, tape drives, and data archival storage systems, etc.

A cloud computing environment may comprise one or more cloud computing nodes with which local computing devices used by cloud consumers, such as, for example, personal digital assistant (PDA) or cellular telephone, desktop computer, laptop computer, and/or automobile computer system may communicate. The nodes may communicate with one another. They may be grouped physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of the computing devices are intended to be illustrative only and that the computing nodes and cloud computing environment can communicate with any type of computerized device over any type of network and/or network addressable connection (e.g., using a web browser).

As known in the art, a set of functional abstraction layers may be provided by a cloud computing environment. Generally, the following layers and corresponding functions may be provided:

A hardware and software layer includes hardware and software components. Examples of hardware components include: mainframes; RISC (Reduced Instruction Set Computer) architecture based servers; servers; blade servers; storage devices; and networks and networking components. In some embodiments, software components include network application server software and database software.

A virtualization layer provides an abstraction layer from which the following examples of virtual entities may be provided: virtual servers; virtual storage; virtual networks, including virtual private networks; virtual applications and operating systems; and virtual clients.

In one example, a management layer may provide the functions described below. Resource Provisioning provides dynamic procurement of computing resources and other resources that are utilized to perform tasks within the cloud computing environment. Metering and Pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provides pre-arrangement for, and procurement of, cloud computing resources for which a future requirement is anticipated in accordance with an SLA. As may be appreciated, embodiments of the present disclosure may be implemented in the management layer.

A workloads layer provides examples of functionality for which the cloud computing environment may be utilized. Examples of workloads and functions which may be provided from this layer may include: mapping and navigation; software development and lifecycle management; virtual classroom education delivery; data analytics processing; transaction processing 95; etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the terms "data", "content", "information", and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Although the terms first, second, third, etc. may be used herein to describe various elements, components, interfaces, and/or layers, these elements, components, interfaces, and/or layers should not be limited by these terms. These terms may be only used to distinguish one element, component, interface, or layer from another element, component, interface or layer. Terms such as "first," "second," and other numerical terms when used herein do not imply a sequence or order unless clearly indicated by the context. Thus, a first element, component, interface, or layer discussed below could be termed a second element, component, interface, layer without departing from the teachings of the example embodiments.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus comprising
at least one processor; and
at least one memory including computer program code for one or more programs, the at least one memory and the computer program code configured to, with the at least one processor, cause the apparatus to perform at least the following:
provide event correlation as a Service (CORRaaS) to one or more of tenants as virtualized security appliances or virtualized security functions for one or more of tenants' slices,
generate a second interface for allowing the one or more of tenants to configure the event correlation as a Service (CORRaaS), and
correlate and process one or more security events from the virtualized security functions in the one or more of tenants' slices to form processed security event data, and to detect or predict attacks or anomalies or incompliance with security requirements;
determine a third interface to transfer the processed security event data and/or log data and/or raw data to the one or more of the tenants' security management systems and/or to a one or more of cloud service providers' security management systems;
determine a fourth interface towards a cloud manager of the cloud service provider to cause the cloud manager to mitigate the detected or predicted attacks or anomalies or incompliance with the security requirements;
wherein the cloud manager is a 5G cloud manager;
wherein the fourth interface is further configured to receive incident and log data in the one or more of tenant's slices and/or clouds, and/or in a one or more of providers' clouds from the 5G cloud manager; and
wherein the memory and computer program code are further configured to, with the processor, cause the apparatus to correlate and process the one or more security events from the virtualized security functions, and the incident and log data from the 5G cloud manager to form the processed security event data, and to detect or predict attacks or anomalies or incompliance with the security requirements.

2. The apparatus of claim 1, wherein the memory and computer program code are further configured to, with the processor, cause the apparatus to provide the even correlation as a Service (CORRaaS) to the one or more of the tenants as a managed service.

3. The apparatus of claim 1, wherein the third interface is further configured to receive processed or raw event data or log data from the one or more of tenants' security management systems and/or from the one or more of the cloud service providers' security management systems; and
wherein the memory and computer program code are further configured to, with the processor, cause the apparatus to correlate and process the one or more security events from the virtualized security functions, and the processed or raw event data or log data from the tenants' security management systems and/or from the one or more of cloud service providers' security management systems to form the processed security event data, and to detect or predict attacks or anomalies or incompliance with the security requirements.

4. The apparatus of claim 1 wherein the second interface is further configured to allow the one or more of tenants to configure the event correlation as a service by defining correlation rules and mitigation strategies for the one or more of tenants' slices, and/or to re-configure the event correlation as a service by updating correlation rules and mitigation strategies for the one or more of tenants' slices during run-time.

5. The apparatus of claim 1, wherein the memory and computer program code are further configured to, with the processor, cause the apparatus to, at least one of correlate and combine related one or more security events, reduce false positives and duplicated security events, and filter out privacy or sensitive information of the one or more tenants and/or the one or more cloud service providers to form the processed security event data.

6. The apparatus of claim 1, wherein the fourth interface is further configured to cause the cloud manager to adjust resources in the one or more of tenants' slices during run-time of a service in order to mitigate the detected attacks or anomalies or incompliance with the security requirements.

7. The apparatus of claim 1, further comprising:
determine a first interface to configure the virtualized security functions in the one or more of tenants' slices, and for reconfiguring the virtualized security functions in the one or more of tenants' slices during run-time of a service to mitigate the detected attacks or anomalies or incompliance with the security requirements.

8. The apparatus of claim 7, wherein the configuring of the virtualized security functions is further caused to configure correlation rules and/or mitigation strategies, and
wherein the reconfiguring of the security functions is further caused to reconfigure the correlation rules and/or mitigation strategies.

9. The apparatus of claim 7, wherein the memory and computer program code are further configured to, with the processor, cause the apparatus:
predict impact from deployment and/or configuration and/or reconfiguration of the virtualized security functions on performance requirements from the one or more of the tenants, and
guarantee the performance requirements from the one or more of tenants by configuring or reconfiguring the virtualized security functions through the first interface and/or configuring or reconfiguring the correlation as a Service (CORRaaS) through the second interface to avoid incompliance with the performance requirements.

10. The apparatus of claim 7, further comprising a fifth interface towards a SLA manager configured to receive security related Service Level Agreements (SLAs);
wherein the memory and computer program code are further configured to, with the processor, cause the apparatus to:
monitor enforcements of the security related Service Level Agreements for services provided to the one or more of tenants,
detect or predict a possible security related Service Level Agreement violation for a service provided to a tenant of the plurality of tenants, and
mitigate the possible security related Service Level Agreement violation by initiating configuration or reconfiguration of the virtualized security functions through the first interface and/or configuration or reconfiguration of the correlation as a Service (CORRaaS) through the second interface, and/or by sending information about the possible security related Service Level Agreement violation to the SLA manager through the fifth interface.

11. The apparatus of claim 10, wherein the first interface is further configured to configure or re-configure the virtualized security functions based on the security related Service Level Agreements; and/or
wherein the memory and computer program code are further configured to, with the processor, cause the apparatus to provide the correlation as a Service (CORRaaS) to the one or more of tenants based on the security related Service Level Agreements; and/or
wherein the third interface is further configured to cause to transfer the processed security event data and/or log data and/or raw data to the one or more of tenants' security management systems and/or to the one or more of cloud service providers' security management systems based on the security related Service Level Agreements.

12. The apparatus of claim 10, wherein the fifth interface is further caused to receive performance related Service Level Agreements from the SLA manager, and
wherein the memory and computer program code are further configured to, with the processor, cause the apparatus to:
predict impact from the deployment and/or re-deployment and/or configuration and/or reconfiguration of the virtualized security functions on performance requirements from the one or more of tenants, and
guarantee the performance requirements from the one or more of tenants based on the performance related Service Level Agreements by initiating configuration or reconfiguration of the virtualized security functions through the first interface and/or configuration or reconfiguration of the correlation as a Service (CORRaaS) through the second interface to avoid possible Service Level Agreement violations, and/or by sending information about possible Service Level Agreement violations to the SLA manager through the fifth interface.

13. The apparatus of claim 12,
wherein the first interface is further caused to deploy and configure the virtualized security functions based on the performance related Service Level Agreements; and/or
wherein the memory and computer program code are further configured to, with the processor, cause the apparatus to provide the correlation as a Service (CORRaaS) to the one or more of tenants based on the performance related Service Level Agreements.

14. The apparatus of claim 1, further comprising a sixth interface caused to allowe an administrator to deploy and configure the virtualized security functions, and/or to specify rules and settings for the collection, correlation, detection and/or mitigation, and/or security requirements.

15. The apparatus of claim 1, wherein the tenants' security management systems are instances of the apparatus installed on the tenants as cloud service providers.

16. The apparatus of claim 1, wherein the first layer cloud service provider is an IaaS/PaaS cloud service provider, and the second layer cloud service provider is an SaaS cloud service provider, or wherein the first layer cloud service provider is a SaaS cloud service provider as a tenant of an IaaS/PaaS cloud service provider and offering network slices, and the second layer cloud service provider is a vertical business provider operating a network slice.

17. A method for security management based on event correlation in a distributed multi-layered cloud environment, the method comprising:
providing correlation as a Service (CORRaaS) to one or more of tenants as virtualized security appliances or virtualized security functions for the one or more of tenants' slices, and allowing the one or more tenants to configure the correlation as a Service (CORRaaS);
correlating and processing security events from the virtualized security functions in the one or more of tenants' slices to form processed security event data, and to detect or predict attacks or anomalies or incompliance with security requirements;

transferring the processed security event data and/or log data and/or raw data to the tenants' security management systems and/or to cloud service providers' security management systems respectively;

causing a cloud manager of the cloud service provider to mitigate the detected or predicted attacks or anomalies or incompliance with security requirements;

wherein the cloud manager is a 5G cloud manager, the method further comprising:

receiving incident and log data in the plurality of tenant's slices and/or clouds, and/or in a plurality of providers' clouds from the 5G cloud manager; and wherein the correlating and processing comprises:
correlating and processing the security events from the security functions, and the incident and log data from the 5G cloud manager to form the processed security event data, and to detect or predict attacks or anomalies or incompliance with security requirements.

18. A non-transitory computer readable medium having stored thereon a set of computer readable instructions that, when executed by at least one processor, cause an apparatus to: provide correlation as a Service (CORRaaS) to one or more of tenants as virtualized security appliances or virtualized security functions for the one or more of tenants' slices, generate a second interface for allowing the one or more of tenants to configure the correlation as a Service (CORRaaS), and correlate and process security events from the virtualized security functions in the one or more of tenants' slices to form processed security event data, and to detect or predict attacks or anomalies or incompliance with security requirements;

generate a third interface for transferring the processed security event data and/or log data and/or raw data to the plurality of tenants' security management systems and/or to a plurality of cloud service providers' security management systems;

generate a fourth interface towards a cloud manager of the cloud service provider for causing the cloud manager to mitigate the detected or predicted attacks or anomalies or incompliance with security requirements;

wherein the cloud manager is a 5G cloud manager;

wherein the fourth interface is further configured to receive incident and log data in the one or more of tenant's slices and/or clouds, and/or in a one or more of providers' clouds from the 5G cloud manager; and wherein the memory and computer program code are further configured to, with the processor, cause the apparatus to correlate and process the one or more security events from the virtualized security functions, and the incident and log data from the 5G cloud manager to form the processed security event data, and to detect or predict attacks or anomalies or incompliance with the security requirements.

* * * * *